(12) United States Patent
Pearson

(10) Patent No.: X2424
(45) Date of Patent: Jan. 24, 1816

(54) POWER, MAINTAINING,APPLIED BOARDSHIP

(76) Inventor: David Pearson

[illegible]avid [illegible]earson

Letters Patent

The Schedule referred to in these Letters Patent and making part of the same containing a description in the words of the said David Pearson himself of his maintaining Power applied on board Ships &c This maintaining power takes in the [illegible] of the tiller or wheel rope when the tiller is a lee. The two ends of the tiller or wheel rope are rove through two blocks at the head of the tiller, and made fast to two iron sliders fastened to the tiller. There are two maintaining ropes fastened to the after ends of the sliders, then the after ends of said ropes are rove through the blocks fastened to the tiller about 14 inches from the rudder head, then they are made fast to two staples in the deck of the vessel about 2 feet from the tiller, and when the tiller is amidships the ropes are to be made fast, then by moving the tiller a lee, the weather maintaining rope hauls the weather slide aft, the lee slide remaining the same as when the tiller was amidships by means of a stopper on the after ends of the sliders. The weather slide will work down if the tiller be moved from amidships, but the lee one will not work up so that the angle of the ~~angle of the~~ tiller that makes the slack rope is maintained by the same angle, by the application of two iron sliders, two maintaining ropes and four blocks in the cord manner above mentioned, which is a complete remedy for the slack rope.

Witnesses
Jeremiah Nelson
John Peabody

David Pearson (264 Words)

(Granted January 24. 1816)